3,331,827
POLYMERIZATION CATALYST
Marvin A. McCall and Ray B. Blanton, Kingsport, Tenn., assignors to Eastman Kodak Company, Rochester, N.Y., a corporation of New Jersey
No Drawing. Filed July 22, 1963, Ser. No. 296,500
20 Claims. (Cl. 260—94.9)

This invention relates to a new and improved polymerization process and is particularly concerned with the use of a novel catalyst combination for preparing high molecular weight solid polyolefins, such as polyethylene and polypropylene, of high density and crystallinity. In a particular aspect the invention is concerned with the preparation of polyethylene, polypropylene and polymers of other olefins using a particular catalyst combination which has unexpected catalytic activity and which gives products characterized by unusually high crystallinity, softening point, thermal stability, stiffness and being substantially free of non-crystalline polymers.

Polyethylene has heretofore been prepared by high pressure processes to give relatively flexible polymers having a rather high degree of chain branching and a density considerably lower than the theoretical density. Thus, pressures of the order of 500 atmospheres or more and usually of the order of 1000–1500 atmospheres are commonly employed. It has been found that more dense polyethylenes can be produced by certain catalyst combinations to give polymers which have very little chain branching and a high degree of crystallinity, and some of these catalyst combinations have been found to be effective for making solid, crystalline polypropylene. The exact reason why certain catalyst combinations give these highly dense and highly crystalline polymers is not readily understood. Furthermore, the activity of the catalysts ordinarily depends upon certain specific catalyst combinations, and the results are ordinarily highly unpredictable, since relatively minor changes in the catalyst combination often lead to liquid polymers rather than the desired solid polymers.

The catalyst combinations that have usually been employed to produce crystalline polyethylene, polypropylene and polymers of other $\alpha$-olefins have contained a transition metal compound, such as a titanium halide, and a reducing agent. Useful reducing agents have been various metals or compounds of these metals and particularly the organometallic compounds. Especially useful reducing agents have been found to be aluminum metal and organoaluminum compounds, such as triethyl aluminum. These catalyst combinations have been altered and improved by the addition of certain third components that have improved the crystallinity of the polymer. Useful third components are the organophosphorus compounds, such as a trialkyl phosphine and triphenyl phosphine. Whenever these third components, such as the organophosphorus compounds, have been used in these catalyst combinations, it has been considered essential to retain the reducing agent as a component of the catalyst system.

This invention is concerned with and has for an object the provision of improved processes whereby $\alpha$-olefins and particularly ethylene, propylene and higher $\alpha$-olefins can be readily polymerized by catalytic means to give high molecular weight, highly crystalline polymers. A particular object of the invention is to provide a catalyst combination which has unexpected catalytic activity for the polymerization of $\alpha$-monoolefins to form crystalline, high density polymers. Other objects will be apparent from the description and claims which follow.

In accordance with this invention, we have discovered novel catalyst systems for these polymerization reactions wherein the reducing agents normally employed heretofore are excluded from the catalyst. The above and other objects are attained by means of the process embodying the present invention wherein $\alpha$-olefins, either singly or in admixture, are readily polymerized to high molecular weight, solid, crystalline polymers by effecting the polymerization in the presence of a catalytic mixture containing a compound of a transition metal selected from the group consisting of titanium, vanadium, zirconium, chromium and molybdenum, said compound being selected from the group consisting of halides, alkoxyhalides and acetylacetonates and a compound having the formula $R_3Z$ wherein Z is selected from the group consisting of phosphorus, antimony and bismuth and each R is selected from the group consisting of hydrogen, and hydrocarbon radicals containing 1 to 12 carbon atoms and selected from the group consisting of alkyl, aryl and aralkyl. Among these hydrocarbon radicals are methyl, ethyl, propyl, butyl, actyl, dodecyl, phenyl, phenylethyl and naphthyl. In the compound designated as $R_3Z$ the three radicals represented by R can be the same or different. The catalytic activity of this mixture was wholly unexpected, particularly since the mixture contains none of the reducing agents that prior to this invention were employed in these catalyst mixtures.

The inventive process is carried out in liquid phase in an inert organic liquid and preferably an inert liquid hydrocarbon vehicle, but the process can be carried out in the absence of a diluent. The process proceeds with excellent results over a temperature range of from 0° C. to 250° C., although it is preferred to operate within the range of from about 50° C. to about 150° C. Likewise, the reaction pressures may be varied widely from about atmospheric pressure to very high pressures of the order of 20,000 p.s.i. or higher. A particular advantage of the invention is that pressures of the order of 30–1000 p.s.i. give excellent results, and it is not necessary to employ the extremely high pressures which were necessary heretofore. The liquid vehicle employed is desirably one which serves as an inert liquid reaction medium.

The invention is of particular importance for the polymerization of ethylene. However, higher $\alpha$-olefins containing up to 10 carbon atoms and mixtures of $\alpha$-olefins, e.g. ethylene and propylene, can be polymerized by practicing our invention. The polyethylene which is obtained in accordance with this invention has a softening or fusion point greater than 120° C. whereby the products prepared therefrom can be readily employed in contact with boiling water without deformation or other deleterious effects. The process of the invention readily results in solid polymers having molecular weights greater than 1000 and usually greater than 10,000. Furthermore, polymers having molecular weights of as much as 1,000,000 or higher can be readily prepared if desired. The high molecular weight, high density polyethylene of this invention are insoluble in solvents at ordinary temperatures but they are soluble in such solvents as xylene, toluene or tetralin at temperatures above 100° C. These solubility characteristics make it possible to carry out the polymerization process under conditions wherein the polymer formed is soluble in the reaction medium during the polymerization and can be precipitated therefrom by lowering the temperature of the resulting mixture.

The polyethylenes of this invention are highly crystalline and usually exhibit crystallinity above 80% as shown by X-ray diagrams. Ordinarily, the crystallinities of the polyethylenes obtained by this process average close to 90%. In contrast to the high pressure polyethylene known heretofore, the number of methyl groups per hundred carbon atoms in the polyethylenes of this invention are of the order of 0.5 or lower. The densities are of the order of 0.945 or higher, with densities of the order of 0.96 or higher being obtained in many cases. The inherent viscosity as measured in tetralin at 145° C. can be varied from about 0.5 or lower to 5.0 or higher. Melt indices as measured by the standard ASTM method may be varied from about 0.1 to 100 or even higher.

The novel catalysts described above are also useful for polymerizing propylene to form a crystalline, high density polymer. The polypropylene produced has a softening point above 155° C. and a density of 0.91 and higher. Usually, the density of the polypropylene is of the order of 0.91 to 0.92.

The polymers prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polyolefins obtained according to this process.

The improved results obtained in accordance with the invention depend upon the particular combination of catalyst materials defined herein. Thus, one of the components of the catalyst is a compound of a transition metal selected from the group consisting of titanium, vanadium, zirconium, chromium and molybdenum, said compound being selected from the group consisting of halides, alkoxyhalides and acetylacetonates. In these compounds the transition metal can be at its maximum valence, but it is possible to employ a compound of a transition metal having a reduced valence. In the alkoxyhalides, the alkyl groups contain from 1 to 12 carbon atoms. Such compounds as titanium tetrachloride, titanium trichloride, titanium tribromide, titanium triiodide, dihexoxy titanium dichloride, dibutoxy titanium dichloride, diethoxy titanium dichloride and titanium acetylacetonate can be used in the catalyst combination. Similar compounds of zirconium, vanadium, chromium and molybdenium can also be used. For the most desirable results it is preferred to use a halide of titanium having either its maximum valency or a reduced valency and specifically it is preferred to employ either titanium tetrachloride or titanium trichloride in the catalyst composition. The catalyst composition also contains a compound having the structural formula $R_3Z$ wherein Z is selected from the group consisting of phosphorus, antimony and bismuth and each R is a radical selected from the group consisting of hydrogen and hydrocarbon radicals containing 1 to 12 carbon atoms and selected from the group consisting of alkyl, aryl and aralkyl. The R radicals can be the same, but in some instances it is desired to employ different radicals within the definition set forth above. Among the specific compounds that can be used are trioctylphosphine, tributylphosphine, triphenylphosphine, triphenylbismuthine, triphenylstibine and the like. The catalyst compositions of this invention, when reacted with water, do not produce hydrogen.

Catalyst compositions that are useful in the practice of the invention are:

(a) titanium acetylacetonate and tridodecylphosphine
(b) zirconium tetrachloride and trimethylphosphine
(c) vanadium trichloride and tri-p-tolylphosphine
(d) chromium tribromide and triisopropylphosphine
(e) molybdenum tetrabromide and tri-tert-butylphosphine
(f) titanium dibutoxy dichloride and triethylphosphine
(g) titanium trichloride and tri-n-pentylphosphine
(h) vanaduim triiodide and tri-n-hexylphosphine
(i) titanium tetrabromide and triethylbismuthine
(j) vanadium trichloride and triphenylstibine The limiting factor in the temperature of the process appears to be the decomposition temperature of the catalyst. Ordinarily, temperatures from 50° C. to 150° C. are employed, although temperatures as low as 0° C. or as high as 250° C. can be employed if desired. Usually, it is not desirable or economical to effect the polymerization at temperatures below 0° C., and the process can be readily controlled at room temperature or higher which is an advantage from the standpoint of commercial processing. The pressure employed is usually only sufficient to maintain the reaction mixture in liquid form during the polymerization, although higher pressures can be used if desired. The pressure is ordinarily achieved by pressuring the system with the monomer whereby additional monomer dissolves in the reaction vehicle as the polymerization progresses.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. For a solution type of process it is preferred to use a concentration from about 2 to about 10% by weight based on the weight of the vehicle, and for a slurry type of process higher concentrations, for example, up to 40% and higher are preferred. Higher concentrations of monomer ordinarily increase the rate of polymerization, but concentrations above 5–10% by weight in a solution are ordinarily less desirable because the polymer dissolved in the reaction medium results in a very viscous solution.

The molar ratio of transition metal halide to $R_3Z$ compound can be varied within the range of from 5.0 to 0.5.

It will be understood that higher and lower molar ratios are within the scope of this invention. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-octane, isooctane, methyl cyclohexane, tetralin, decalin, and any of the other well known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The diluents employed in practicing this invention can be advantageously purified prior to use in the polymerization reaction by contacting the diluent, for example, in a distillation procedure or otherwise, with the polymerization catalyst to remove undesirable trace impurities. Also prior to such purification of the diluent the catalyst can be contacted advantageously with a polymerizable α-monoolefin.

Thus, by means of this invention polyolefins are readily produced using a catalyst combination which, based on the knowledge of the art, would not be expected to produce the results obtained. The polymers thus obtained can be extruded, mechanically milled, cast or molded as desired. The polymers can be used as blending agents with the relatively more flexible high pressure polyethylenes to give any desired combination of properties. The polymers can also be blended with antioxidants, stabilizers, plasticizers, fillers, pigments, and the like, or mixed with other polymeric materials, waxes and the like. In general, aside from the relatively higher values for such properties as softening point, density, stiffness and the like, the polymers embodying this invention can be treated in similar manner to those obtained by other processes. The molecular weight of the polymers can be varied over a wide range by introducing hydrogen to the polymerization reaction. Such hydrogen can be introduced separately or in admixture with the olefin monomer. The polymers produced in accordance with this invention can be separated from polymerization catalyst by suitable extraction procedures, for example, by washing with water or lower aliphatic alcohols such as methanol.

This invention can be practiced using a two-component catalyst system containing the transition metal compounds and the compounds designated by $R_3Z$ as defined above. No other component is required in this catalyst system for the production of high molecular weight, crystalline polyhydrocarbons. However, if desired, other additives can be used in comparatively small amounts. These catalyst additives themselves are not suitable catalysts for polymerizing the olefinic monomers to solid, crystalline polymers. However, their use in these catalyst systems enhances the activity of the catalyst and results in an improved yield of high molecular weight, crystalline polymer. Among the additives that can be used in our catalyst systems are the halides of metals in Groups I, II and III of the Periodic Table. Specifically, halides of alkali metals, aluminum, magnesium, zinc and copper have been found to be quite useful in our catalyst systems, and the halides that are used can be the fluorides, chlorides, bromides or iodides. More specifically, sodium chloride, potassium chloride, lithium chloride, aluminum trichloride, magnesium dichloride, zinc dichloride and copper dichloride have been found to be particularly useful. These additives are used in small amounts, usually within the range of 0.1 to 5% by weight of the total catalyst system. The polymerization reaction can also be carried out under a partial pressure of hydrogen.

The transition metal compound and compound designated as $R_3Z$ can be added to the polymerization reaction either separately or in a mixture. It is also possible to prepare a complex of the two catalyst components prior to use in the polymerization reaction, and this complex can be used to carry out the desired polymerization. The complex can be designated by the formula $(R_3Z)_nMX_3$ wherein $R_3Z$ represents the phosphine, stibine or bismuthine compounds described above, $MX_3$ represents the transition metal compound described above, and $n$ is a whole number varying from 1 to 4. The formation of the complex can be illustrated by the use of triphenylphosphine and titanium tetrachloride as catalyst components. Two moles of the triphenylphosphine are reacted with one mole of titanium tetrachloride to form a complex containing the three moles of reactants. This complex can be used as a catalyst, and in some instances it is desirable to react the complex with a reducing agent. Suitable reducing agents are the organometallic compounds, for example, aluminum triethyl, diethyl aluminum monohalide, lithium butyl and the like. After the desired reduction reaction has taken place, the complex is separated from reaction by-products and washed with a suitable solvent. The resulting complex is then ready for use as a catalyst for the olefin polymerization reaction. The complex can be used without any catalyst additives, but, if desired, the catalyst additives discussed above can be used with the complex.

The catalyst compositions have been described above as being effective primarily for the polymerization of α-monoolefins. These catalyst compositions can, however, be used for polymerizing other α-olefins, and it is not necessary to limit the process of the invention to monoolefins. Other α-olefins that can be used are butadiene, isoprene, 1,3-pentadiene and the like.

The following examples are illustrative of this invention.

*Example 1*

Dry triphenylphosphine and titanium trichloride in the mole ratio of 1:1.7 were placed in a stainless steel autoclave (total catalyst wt. 3.0 g.) under a nitrogen atmosphere, with 50 ml. of dry toluene as solvent. The thus charged autoclave was pressured with 1000 p.s.i. ethylene and heated to 80° C. for 4 hours. The polyethylene obtained from this reaction was processed by washing with dry isobutanol, yield of dry powdered polyethylene was 44 grams, density 0.957, with high viscosity. A hard, tough button was pressed from this material.

Example 2

The results obtained from a series of runs similar to that described in Example 1 except that the mole ratio of triphenylphosphine to titanium trichloride was varied are given in the following table:

| Run | Mole Ratio $(C_6H_5)_3P/TiCl_3$ | Yield, g. |
|---|---|---|
| A | 2/1 | 4.5 |
| B | 1/1 | 10.0 |
| C | 1/1.9 | 47.0 |
| D | 1/2.5 | 44.0 |
| E | 1/3 | 44.0 |
| F | 1/5 | 49.0 |

Example 3

The results obtained from a series of runs similar to that described in Example 1 were carried out at different temperatures. The results are given in the following table:

| Run | Temperature, °C. | Yield, g. |
|---|---|---|
| A | 50 | 18 |
| B | 70 | 48 |
| C | 80 | 50 |
| D | 100 | 40 |
| E | 150 | 35 |
| F | 200 | 38 |

Example 4

The results obtained from a series of runs similar to that described in Example 1 were carried out with certain variations in solvent and additives present. The results are given in the following table:

| Run | Solvent | Additive (0.1–0.2 g.) | Yield, g. |
|---|---|---|---|
| A | Toluene | NaCl | 32.0 |
| B | Heptane | $AlCl_3$ | 50.0 |
| C | Hexane | $MgCl_2$ | 45.0 |
| D | Benzene | $ZnCl_2$ | 39.0 |
| E | None | None | 36.0 |
| F | Toluene | $H_2$ (50 p.s.i.) | 20.0 |

Example 5

The results obtained from two runs using the same mole ratio, and same procedure given in Example 1 except that the temperature was at 50° C. and the pressure at 250 p.s.i. ethylene were carried out with and without a halide additive. The results are shown below in the following table:

| Run | Initial Ethylene Pressure, p.s.i. | Halide Additive | Yield, g. | Density |
|---|---|---|---|---|
| A | 250 | 0.1 g. $AlCl_3$ | 14 | 0.95 |
| B | 250 | None | 5 | 0.95 |

Example 6

The catalyst and procedure given in Example 1 was used with 150 cc. of propylene monomer charge. The yield of solid polypropylene was 2.1 g. In a similar manner butadiene was polymerized with this catalyst.

Example 7

The results obtained from a series of runs similar to that described in Example 1 were carried out with certain catalyst composition variations as shown in the following table where triphenylphosphine of Example 1 was substituted by tributylphosphine and triphenylantimony. The ratio of first component to the $TiCl_3$ was 1/1.7 with toluene solvent and an initial pressure of ethylene of 1000 p.s.i.

| Catalyst Components | Additives | Yield Polyethylene,g. | Density |
|---|---|---|---|
| $(C_4H_9)_3P/TiCl_3$ | None | 44.0 | 0.940 |
| $(C_6H_5)_3Sb/TiCl_3$ | 0.1 g. $AlCl_3$ | 61.0 | 0.950 |
| $(C_6H_5)_3Bi/TiCl_3$ | 0.1 g. $AlCl_3$ | 40.0 | 0.945 |

In a similar manner, it was shown that the hydrogen reduced $TiCl_3$ generally designated as *alpha* form could be replaced with beta or brown $TiCl_3$. The yields here were very high up to 70° C. and reaction was exothermic starting at about room temperature. The polymer was of very high molecular weight and the density was in the 0.95 range.

Example 8

A new complex was prepared by reacting $TiCl_4$ with triphenylphosphine in benzene solution. The dark red to black crystalline complex was isolated by filtering. Analytical data for phosphorus, titanium and chlorine supports the above formula. This complex (2.0 g.) was used in toluene for the polymerization of ethylene and propylene using 1000 p.s.i. ethylene and 150 cc. of propylene. The yields of crystalline polymer from these two reactions were 1.83 g. and 2.07 g.

When this complex $[(C_6H_5)_3P]_2TiCl_4$ was reduced in situ with lithium butyl, the yield of crystaline polyethylene was 86.0 g.

This complex $[(C_6H_5)_3P]_2TiCl_4$ was reduced with 1 equivalent of triethylaluminum and the resulting new complex, $[(C_6H_5)_3P]TiCl_3$ was isolated as a brown crystalline solid. Analytical data for this new complex for phosphorus, titanium and chlorine support the formulation given to this new triphenylphosphine-titanium trichloride complex. When this complex was used as catalyst in toluene solvent, 1000 p.s.i. ethylene initial pressure at 110° C. the yield of crystalline polyethylene was 17.6 g. A tough, hard button was pressed from this powdered polymer.

Although the invention has been described in considerable detail with reference to certain preferred embodiments thereof, variations and modifications can be effected within the spirit and scope of this invention as described hereinabove and as defined in the appended claims.

We claim:
1. In the polymerization of α-olefinic hydrocarbon material to form solid polymer, the improvement which comprises catalyzing the polymerization with a catalytic mixture consisting essentially of a compound of a transition metal having a valence of at least one less than maximum selected from the group consisting of titanium, vanadium, zirconium, chromium and molybdenum, said compound being selected from the group consisting of halides, alkoxyhalides and acetylacetonates and a compound having the formula $R_3Z$ wherein Z is selected from the group consisting of phosphorus, antimony and bismuth, and each R is selected from the group consisting of hydrogen and hydrocarbon radicals containing 1 to 12 carbon atoms and selected from the group consisting of alkyl, aryl and aralkyl.

2. In the polymerization of α-olefinic hydrocarbon material to form solid polymer, the improvement which comprises catalyzing the polymerization with a catalytic mixture consisting essentially of a halide of a metal having a valence of at least one less than maximum selected from the group consisting of titanium, vanadium, zirconium, chromium and molybdenum, the halogen being selected from the group consisting of chlorine, bromine and iodine, and a compound having the formula $R_3Z$ wherein Z is selected from the group consisting of phosphorus, antimony and bismuth and each R is a radical selected from the group consisting of hydrogen and hydrocarbon radicals containing 1 to 12 carbon atoms and selected from the group consisting of alkyl, aryl and aralkyl.

3. In the polymerization of ethylene to form solid polymer, the improvement which comprises effecting the polymerization in the presence of a catalytic mixture consisting essentially of a titanium trihalide and a compound having the formula $R_3Z$ wherein Z is selected from the group consisting of phosphorus, antimony and bismuth and each R is a radical selected from the group consisting of hydrogen and hydrocarbon radicals containing 1 to 12 carbon atoms and selected from the group consisting of alkyl, aryl and aralkyl.

4. In the polymerization of ethylene to form solid polymer, the improvement which comprises effecting the polymerization in liquid dispersion in an organic liquid and in the presence of a catalytic mixture consisting essentially of titanium trichloride and triphenylphosphine.

5. In the polymerization of ethylene to form solid polymer, the improvement which comprises effecting the polymerization in liquid dispersion in an organic liquid and in the presence of a catalytic mixture consisting essentially of titanium trichloride and triphenylstibine.

6. In the polymerization of ethylene to form solid polymer, the improvement which comprises effecting the polymerization in liquid dispersion in an organic liquid and in the presence of a catalytic mixture consisting essentially of titanium trichloride and triphenylbismuthine.

7. In the polymerization of ethylene to form solid polymer, the improvement which comprises effecting the polymerization in liquid dispersion in an organic liquid and in the presence of a catalytic mixture consisting essentially of titanium trichloride, triphenylphosphine and from 0.1 to 5% by weight of said catalyst of an alkali metal halide.

8. In the polymerization of ethylene to form solid polymer, the improvement which comprises effecting the polymerization in liquid dispersion in an organic liquid and in the presence of a catalytic mixture consisting essentally of titanum trichloride, triphenylphosphine and from 0.1 to 5% by weight of said catalyst of aluminum trichloride.

9. In the polymerization of ethylene to form solid polymer, the improvement which comprises effecting the polymerization in liquid dispersion in an organic liquid and in the presence of a catalytic mixture consisting essentally of titanium trichloride, triphenylphosphine and from 0.1 to 5% by weight of said catalyst of magnesium dichloride.

10. In the polymerization of ethylene to form solid polymer, the improvement which comprises effecting the polymerization in liquid dispersion in an organic liquid and in the presence of a catalyst complex consisting essentially of titanium trichloride and triphenylphosphine, said catalyst complex having been formed prior to use in said polymerization reaction.

11. As a composition of matter, a catalyst for the polymerization of α-olefinic hydrocarbons to solid polymer consisting essentially of a compound of a transition metal having a valence of at least one less than maximum selected from the group consisting of titanium, vanadium, zirconium, chromium and molybdenum, said compound being selected from the group consisting of halides, alkoxyhalides and acetylacetonates and a compound having the formula $R_3Z$ wherein Z is selected from the group consisting of phosphorus, antimony and bismuth, and each R is selected from the group consisting of hydrogen and hydrocarbon radicals containing 1 to 12 carbon atoms and selected from the group consisting of alkyl, aryl and aralkyl.

12. As a composition of matter, a catalyst for the polymerization of α-olefinic hydrocarbons to solid polymer consisting essentially of a halide of a metal having a valence of at least one less than maximum selected from the group consisting of titanium, vanadium, zirconium, chromium and molybdenum, the halogen being selected from the group consisting of chlorine, bromine and iodine, and a compound having the formula $R_3Z$ wherein Z is selected from the group consisting of phosphorus, antimony and bismuth and each R is a radical selected from the group consisting of hydrogen and hydrocarbon radicals containing 1 to 12 carbon atoms and selected from the group consisting of alkyl, aryl and aralkyl.

13. As a composition of matter, a catalyst for the polymerization of α-olefinic hydrocarbons to solid polymer consisting essentially of a titanium trihalide, and a compound having the formula $R_3Z$ wherein Z is selected from the group consisting of phosphorus, antimony and bismuth and each R is a radical selected from the group consisting of hydrogen and hydrocarbon radicals containing 1 to 12 carbon atoms and selected from the group consisting of alkyl, aryl and aralkyl.

14. As a composition of matter, a catalyst for the polymerization of α-olefinic hydrocarbons to solid polymer consisting essentially of titanium trichloride and triphenylphosphine.

15. As a composition of matter, a catalyst for the polymerization of α-olefinic hydrocarbons to solid polymer consisting essentially of titanium trichloride and triphenylstibine.

16. As a composition of matter, a catalyst for the polymerization of α-olefinic hydrocarbons to solid polymer consisting essentially of titanium trichloride and triphenylbismuthine.

17. As a composition of matter, a catalyst for the polymerization of α-olefinic hydrocarbons to solid polymer consisting essentially of titanium trichloride, triphenylphosphine and from 0.1 to 5% by weight of said catalyst of an alkali metal halide.

18. As a composition of matter, a catalyst for the polymerization of α-olefinic hydrocarbons to solid polymer consisting essentially of titanium trichloride, triphenylphosphine and from 0.1 to 5% by weight of said catalyst of aluminum trichloride.

19. As a composition of matter, a catalyst for the polymerization of α-olefinic hydrocarbons to solid polymer consisting essentially of titanium trichloride, triphenylphosphine and from 0.1 to 5% by weight of said catalyst of magnesium dichloride.

20. As a composition of matter, a catalyst complex for the polymerization of α-olefinic hydrocarbons to solid polymer consisting essentially of titanium trichloride and triphenylphosphine, said catalyst complex having been formed prior to use in said polymerization reaction.

References Cited
UNITED STATES PATENTS 3,081,287  3/1963  H. Coover et al. _____ 260—94.9

OTHER REFERENCES

Sittig, Marshall: Polyolefin Resin Processes (1961), p. 132 relied on.

JOSEPH L. SCHOFER, *Primary Examiner.*

L. EDELMAN, *Assistant Examiner.*